(12) United States Patent
Diekmann (10) Patent No.: US 12,300,975 B2
(45) Date of Patent: May 13, 2025

(54) ARRANGEMENT WITH A SUPPORT RAIL AND HOUSINGS STRUNG TOGETHER THEREON

(71) Applicant: Weidmüller Interface GmbH & Co. KG, Detmold (DE)

(72) Inventor: Jörg Diekmann, Oerlinghausen (DE)

(73) Assignee: Weidmüller Interface GmbH & Co. KG (DE)

( * ) Notice: Subject to any disclaimer, the term of this patent is extended or adjusted under 35 U.S.C. 154(b) by 193 days.

(21) Appl. No.: 18/158,125

(22) Filed: Jan. 23, 2023

(65) Prior Publication Data

US 2023/0238783 A1 Jul. 27, 2023

(30) Foreign Application Priority Data

Jan. 25, 2022 (DE) .......................... 102022101707.9

(51) Int. Cl.
*H02B 1/052* (2006.01)
*F16B 2/06* (2006.01)

(52) U.S. Cl.
CPC ............... *H02B 1/052* (2013.01); *F16B 2/06* (2013.01)

(58) Field of Classification Search
CPC ....................................................... F16B 2/06
USPC ....................................................... 361/807
See application file for complete search history.

(56) References Cited

U.S. PATENT DOCUMENTS

| 6,113,253 | A | * | 9/2000 | Yoshii | ................... | B60J 3/0217 |
| | | | | | | 296/214 |
| 2013/0216304 | A1 | * | 8/2013 | Schumacher | ........ | H01R 9/2608 |
| | | | | | | 403/376 |

FOREIGN PATENT DOCUMENTS

| DE | 202017106653 U1 | 3/2019 |
| DE | 102019105077 B4 | 10/2020 |
| FR | 2447132 A1 | 7/1982 |

* cited by examiner

*Primary Examiner* — Timothy J Thompson
*Assistant Examiner* — Michael F McAllister
(74) *Attorney, Agent, or Firm* — LAUBSCHER & FRETWELL, P.C.

(57) ABSTRACT

A support rail on which a plurality of housings equipped with electrical contact elements and/or functional elements, are arranged is mounted onto a mounting base in a mounting position. The support rail is retained by two or more latching devices which are placed in position on the mounting base prior to the support rail being mounted. The latching devices and the support rail are configured such that the support rail can be placed onto the latching device and locked onto it without using any tools. The latching device has a base section having a cross-section relative to the mounting position on the mounting base which corresponds to a U rotated by 180°. The base section is divided into a horizontal base bar and two side bars perpendicular thereto, and the latching element is supported on the mounting base as a thrust bearing via the two side bars.

18 Claims, 11 Drawing Sheets

ARRANGEMENT WITH A SUPPORT RAIL AND HOUSINGS STRUNG TOGETHER THEREON

This application claims priority if DE 10 2022 101 707.9 filed Jan. 25, 2022. The entire content of the priority application is incorporated herein by reference.

BACKGROUND OF THE INVENTION

The invention relates to an arrangement with a support rail on which a plurality of housings, which can be strung together and can be equipped with electrical contact elements and/or functional elements, can be arranged. The support rail can be mounted on the mounting base even in a state in which the housings have already been strung onto the support rail prior to the support rail being mounted. The support rail is attached to the mounting base by at least one latching element which is placed in position on the mounting base prior to the support rail being mounted.

In switch cabinet construction, there is the requirement to string housings of electrical contact elements and functional elements (i.e. housings which can be or are already equipped with electrical contact elements and/or functional elements) on support rails in a previously defined quantity and order and to fix them—for example in a latching manner—on the support rail. By way of example, the support rail can have a hat-like or C-shaped cross-sectional geometry Arranging or fitting and subsequent fixing of each individual housing of the contact and functional elements are customarily carried out on a support rail which is already inserted into the switch cabinet and fixed on a mounting base. The problem is that the sequential fitting of a support rail in the switch cabinet involves, amongst other things, longer processing times and is inefficient compared to the various advantages of mounting prefitted support rails in parallel.

BRIEF DESCRIPTION OF THE PRIOR ART

An arrangement of a support rail on which a plurality of housings which are strung together is known from DE 20 2017 106 653 U1. Attaching the support rail on a mounting base is carried out using mounting bolts onto which the support rail can be placed without tools. The support rail is lockable on the base. The heads of the mounting bolts are equipped with resilient elements to produce an annular snap connection. This solution has proven its worth in practice, but a latching design which is particularly robust and also particularly secure in continual use is desirable.

SUMMARY OF THE INVENTION

In accordance with the invention, an arrangement or assembly is created with a support rail on which a plurality of housings, which can be strung together and which are equipped with electrical contact elements and/or functional elements, can be arranged. The support rail can be mounted onto a mounting base in a mounting position, and in particular can be mounted on the mounting base even in a state in which the housings have already been strung onto the support rail prior to the support rail being mounted. The support rail is retained on the base by two or more latching devices which are placed in position on the mounting base prior to the support rail being mounted, wherein the latching devices and the support rail are correspondingly configured such that the support rail can be placed onto the latching device and locked onto it without the use of any tools. Each latching device has a base section having a cross-section which corresponds to a U rotated by 180°. The base section is divided into a horizontal base bar and two side bars perpendicular thereto and the latching element is supported on the mounting base as a thrust bearing via the two side bars. The latching element has one or more latching limbs for firmly latching the support rail on the mounting base.

As a result, a particularly robust snap connection is created which still fits tightly even after long-term use and which is designed like a snap-on hook latching connection.

According to a preferred embodiment of the invention, one or both of the side bars are lengthened at least at one side of the base section or at both sides of the base section to the latching limbs which are designed and serve to latchingly bear on that side of the support rail which faces away from the mounting base.

As a result, a structurally simple, compactly constructed latching device is created which guarantees a secure fit of the support rail on the mounting base even in use in an environment with relatively strong vibrations.

According to a further embodiment of the invention, the latching limbs in each case are cut free on their side which points towards the mounting base in the mounting position. Alternatively, the latching limbs have a free cut such that, in the mounted state of the latching device—prior to the support rail being mounted on the mounting base—they do not rest on the mounting base but rather are able to perform a pivoting movement about a substantially vertical pivot axis relative to the mounting base in the context of their elastic deformability. Each latching limb flexes in a combination of predominantly bending and some torsion forces due to the off-center application of force precisely at the beginning of the spring path. As a result, a compactly constructed and robust latching device is created through a simple structural measure which can be implemented simply in terms of production technology.

The latching device is preferably configured such that, in the mounted state, its latching limbs do not touch housings arranged on the support rail.

In a further preferred embodiment of the invention, a free cut of the respective latching limb has a parallel section, which runs parallel to the base bar, and an angle section. As a result, a robust compensation of tolerances at the latching device is obtained through a simple structural measure.

According to a further embodiment of the invention, the respective angled section, when the support rail is in the mounted state, opens in a billed manner onto the base limb of the support rail and rests at least in sections on the base limb. As a result, a good placement of the latching device is guaranteed.

Furthermore, according to a further embodiment of the invention, the latching limbs in each case have an insertion chamfer at their free end and the respective insertion chamfer has a rounded region. As a result, an even more simple mounting of the support rail is guaranteed by a simple structural measure.

Furthermore, according to a further preferred configuration of the invention, the respective insertion chamfer is realized by a spatially diagonal bend of the respective latching limb, wherein the bend of both of the respective latching limbs is placed slightly inwards, and the respective insertion chamfer is in each case placed outwards relative to the U-shaped cross-section. As a result, simple mounting of the support rail is achieved by a structural element which is simple to manufacture in terms of production.

In a further preferred embodiment of the invention, when the support rail is in the mounted state, there arises a resilient effect of the respective latching limb against a wall of the longitudinal sides of the respective elongate hole in the support rail. As a result, a robust latching device is created with play-free placement and an enduringly secure function.

According to a further embodiment of the invention, in the latched state, the latching device cooperates with the respective elongate hole, with the elongate hole acting as a mating latching device relative to the latching device, in particular to the latching limbs. As a result, a compactly constructed and robust latching device is created.

According to a further embodiment of the invention, the base section has a bore via which the latching device is attached to the mounting base with an attaching device such as a screw. As a result, the latching device can be attached and placed tightly on the mounting base.

In a further embodiment of the invention, the latching device enables a flush fitting of the support rail onto the mounting base. As a result, a construction-space-saving latching device and a construction-space-saving arrangement of housings on the support rail is created.

In a further preferred embodiment of the invention, the latching device has a locking section on the opposite side of the latching limbs, wherein the locking section is configured such that that, in the mounted state of the latching device, it engages in a bore provided for this purpose which is made in the mounting base. As a result, a latching device which can be easily mounted and which is secure against twisting during the mounting of the locking section is created through a simple structural measure.

According to a further embodiment of the invention, the bore is positioned relative to a threaded bore in the mounting base such that the latching device, after it has been mounted on the mounting base, is oriented in alignment with the elongate holes in the support rail. As a result, a prerequisite is created for a simple and fast mounting of the support rail, since an alignment of the respective latching device to another latching device is dispensed with. The accuracy of the positioning of the latching device is specified by the precision of the positioning of the bores, with the precision of the positioning of the bores depending on the precision of the production of the mounting base, which is usually very high, when the mounting base is produced in tool machines e.g. laser cutting appliances.

Furthermore, according to a further embodiment of the invention, the latching device is preferably manufactured from a metal substance, in particular steel, in one piece as a stamped-and-bent part from a flat material, preferably a strip or a sheet. As a result, a robust latching device which can be produced simply and inexpensively using mass production apparatus is provided.

The latching device has a base section having a cross-section which corresponds to a U rotated by 180°. The base section is divided into a horizontal base bar and two side bars perpendicular thereto. The latching element has one or more latching limbs for firmly latching the support rail on the mounting base.

BRIEF DESCRIPTION OF THE FIGURES

The invention is described in greater detail below with reference to the drawings by means of exemplary embodiments, wherein further advantageous variants and configurations are also discussed. The exemplary embodiments discussed below are not meant to be described conclusively, but on the contrary variants and equivalents which are also not depicted are able to be accomplished. In the drawings.

DETAILED DESCRIPTION

Figure 1:
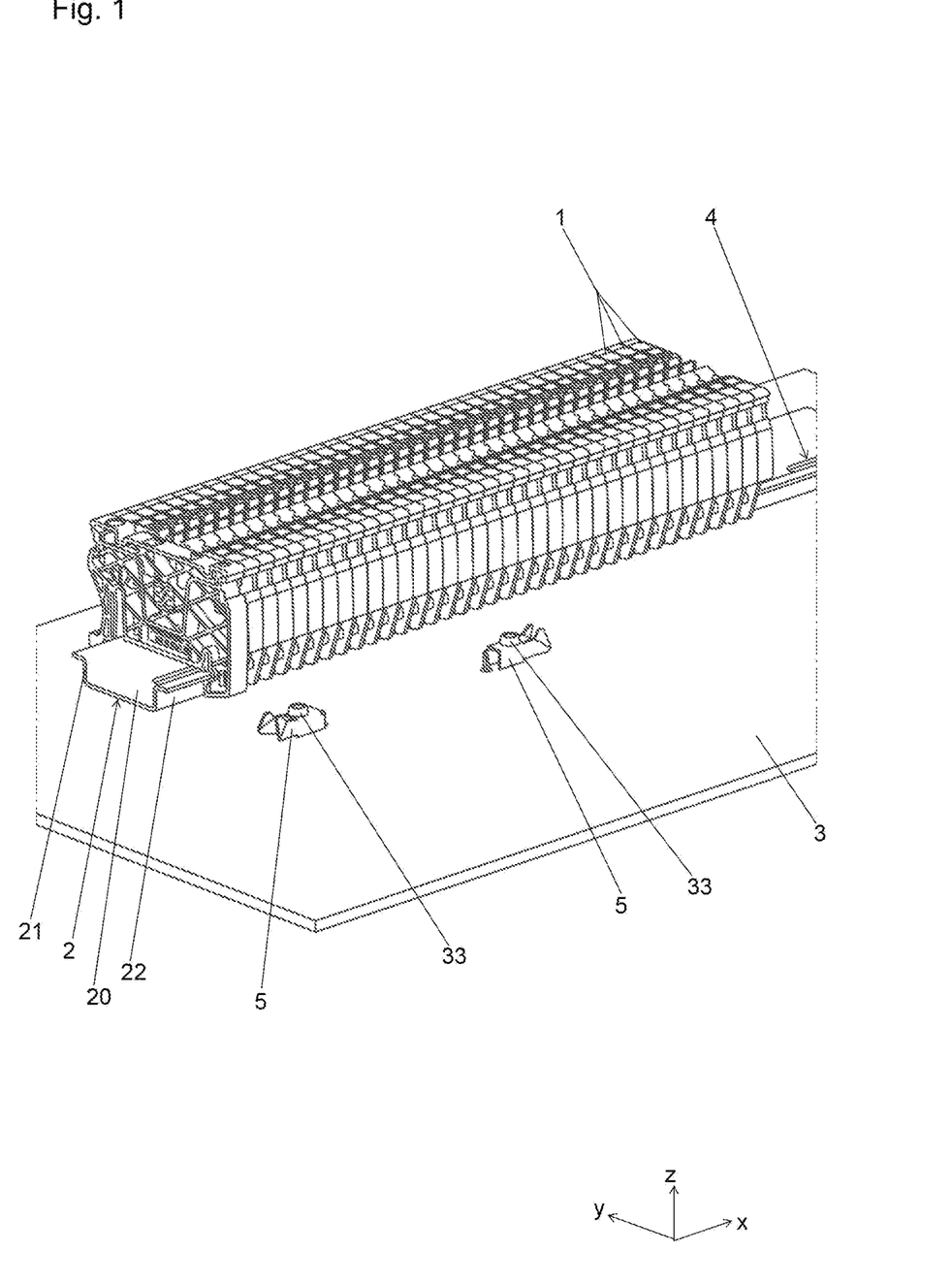
FIG. 1 is an exploded perspective view of strung-together electrical contact elements and functional elements on a support rail which is mounted on a mounting base.

FIG. 1 shows a plurality of strung-together housings including electrical contact elements and functional elements 1 fixed on a support rail 2 which is mounted on a mounting base 3 which can be the mounting base 3 of a switch cabinet (not shown) for example.

Within the context of this description, the phrase "housing including electrical contact elements and functional elements" is to be understood to mean terminal strips, the housings of which are fitted with one or more passive and/or active components, also including conductors and power rails, and electronic housings which are able to be fitted with components.

The support rail 2 has a hat-like cross-sectional geometry, by way of example, but it can also have a different, for example C-shaped, cross-section.

In a first mounting step, the housings 1 (which are to be accommodated on the support rail 2 in accordance with a wiring/circuit diagram) including contact elements and functional elements are mounted strung together in a defined number and order on the support rail 2. For this purpose, latching feet, for example, of the housings 1 are latched onto the support rail 2.

Generally, edges 21, 22 of the support rail 2—which here are L-shaped—are of use for the preassembly of the housings 1 and the support rail 2 into a preassembled unit. A base limb 20 extends between these edges 21, 22. The main direction of projection of the support rail 2 and of this base limb 20 is designated by "x" in the Figs. The latching-on of the housings 1 takes place substantially perpendicular to the support rail 2 and to the mounting base 3—in particular to a level mounting plate—from above in the z-direction. The base limb 20 extends planarly in the x-y plane.

The support rail 2 has in the base limb a plurality (preferably at least two or more) of elongate holes 4 or slot-like openings (also referred to as elongate holes). In the case of an elongate hole 4, the narrow sides can be terminated by semicircles whose diameter corresponds to the width of the elongate hole 4. The longitudinal sides of the elongate hole 4 preferably run parallel to one another. In the case of a slot-like opening—also referred to as an elongate hole—the narrow sides are not terminated by semicircles but rather preferably by straight sides running at right angles to the longitudinal sides. The elongate holes 4 are preferably configured in the base limb 20 of the support rail 2 and can have a defined or constant length and width.

The elongate holes 4 can be arranged in a defined pattern. A particularly preferred pattern includes an arrangement on an imaginary straight line with uniform spacing between each two elongate holes 4. This pattern can optionally have a spacing, which is different from this spacing, from a free end of the support rail 2 in each case to the first elongate hole 4 in each case. The two spacings from the respective free end to the first elongate hole 4 in each case can be of equal size.

Figure 4A:
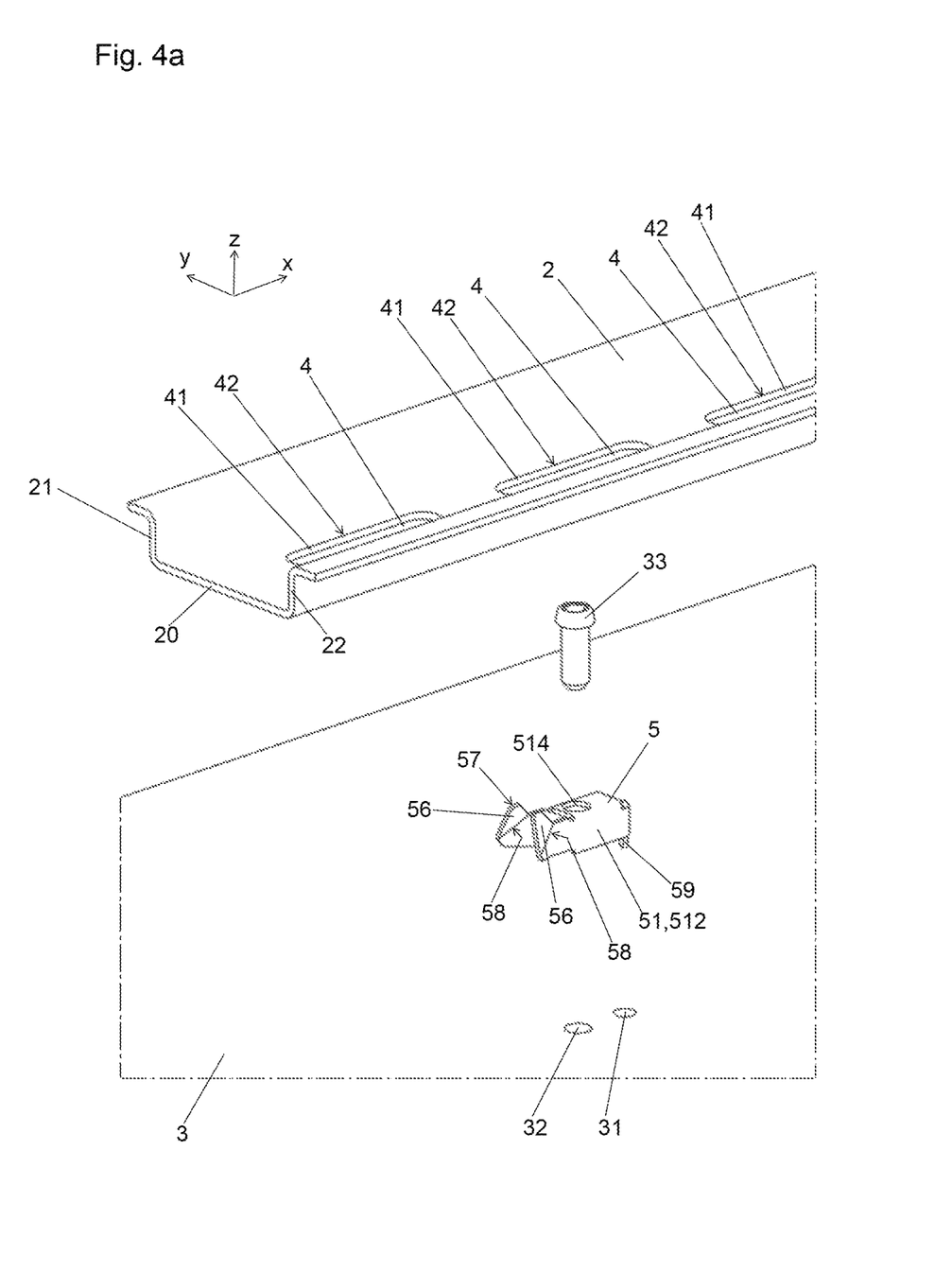
FIGS. 4a, 4b, 4c, and 4d are perspective views illustrating a sequence of method steps, respectively, of mounting the support rail on a mounting base.
Figure 4B:
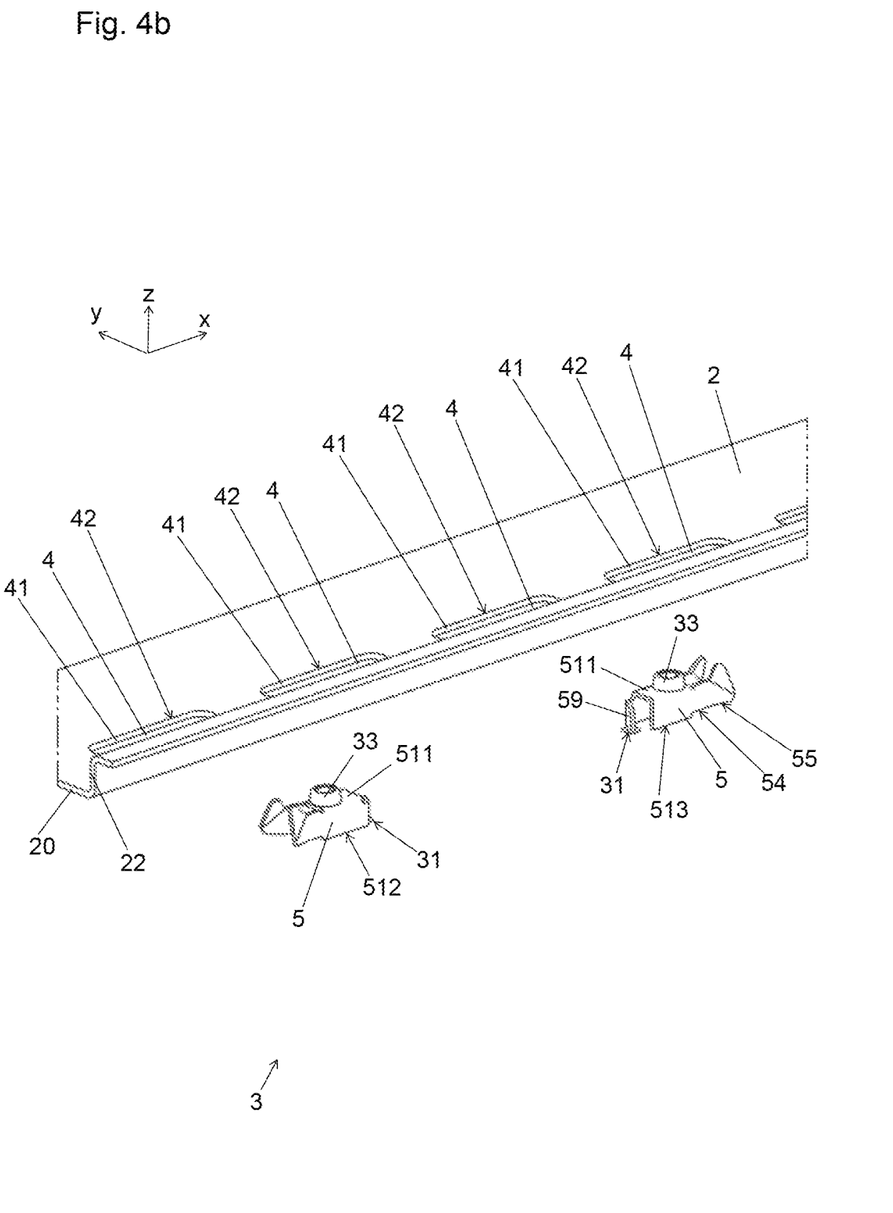

In a second mounting step, which chronologically follows, for example, or if required can also be performed beforehand, latching elements 5 are attached on the mounting base 3 (as shown in FIG. 4a and FIG. 4b), for example tightly screwed into the mounting base 3 with screws 33 (FIG. 4a, 4b) in threaded bores 32 provided for this purpose. The threaded bores 32 of the mounting base 3 preferably correspond, with regard to the pattern of their arrangement, to the pattern of the arrangement of the elongate holes 4 in the support rail 2.

FIGS. 2a to 2d, depict a first preferred configuration of the latching element 5. Direction information below is also geared toward the coordinate system allocated in FIG. 2a to FIG. 2d.

The latching device or element 5 has a base section 51. The base section 51 can have a cross-section which, relative to the mounting position on the mounting base 3, corresponds to a U rotated by 180°. The base section is accordingly divided into a base bar 511 and two side bars 512, 513. The base bar 511 extends in a horizontal plane which is situated parallel to a plane spanned by the x-axis and y-axis. The two side bars 512, 513 extend spaced apart from one another in each case in planes which are parallel to one another and which are situated parallel to a plane spanned by the x-axis and by the z-axis. The latching element 5 is supported on the mounting base 3 as a thrust bearing via the two side bars 512, 513 as shown in FIG. 5a to FIG. 6b.

The base section 51 can have a bore 514 via which the latching device 5 can be attached to the mounting base 3, e.g. by a screw 33 as shown in FIG. 4a and FIG. 4b. The latching device 5 according to the first embodiment is preferably designed symmetrical to two lines of symmetry which are perpendicular to one another and which intersect in the bore 514 and run parallel to the x-axis and to the y-axis respectively.

The side bars 512, 513 are lengthened on both sides of the base section 51—i.e. to latching limbs 52a, 52b and 53a, 53b in the negative and positive x-directions. The latching limbs 52a, 52b, 53a, 53b are cut free on their side which points toward the mounting base 3, so that, in the mounted state of the latching device 5 they do not rest on the mounting base 3 but rather are able to perform a pivoting movement about a substantially vertical or precisely vertical pivot axis—i.e. precisely or substantially parallel to the z-axis—in the context of their elastic deformability. A free cut of the respective latching limb 52a, 52b, 53a, 53b has a parallel section 54 running parallel to the base bar 511, and an angle section 55 at an angle thereto which runs at an angle greater than 10°, as is clearly shown in FIG. 2a.

Figure 5A:
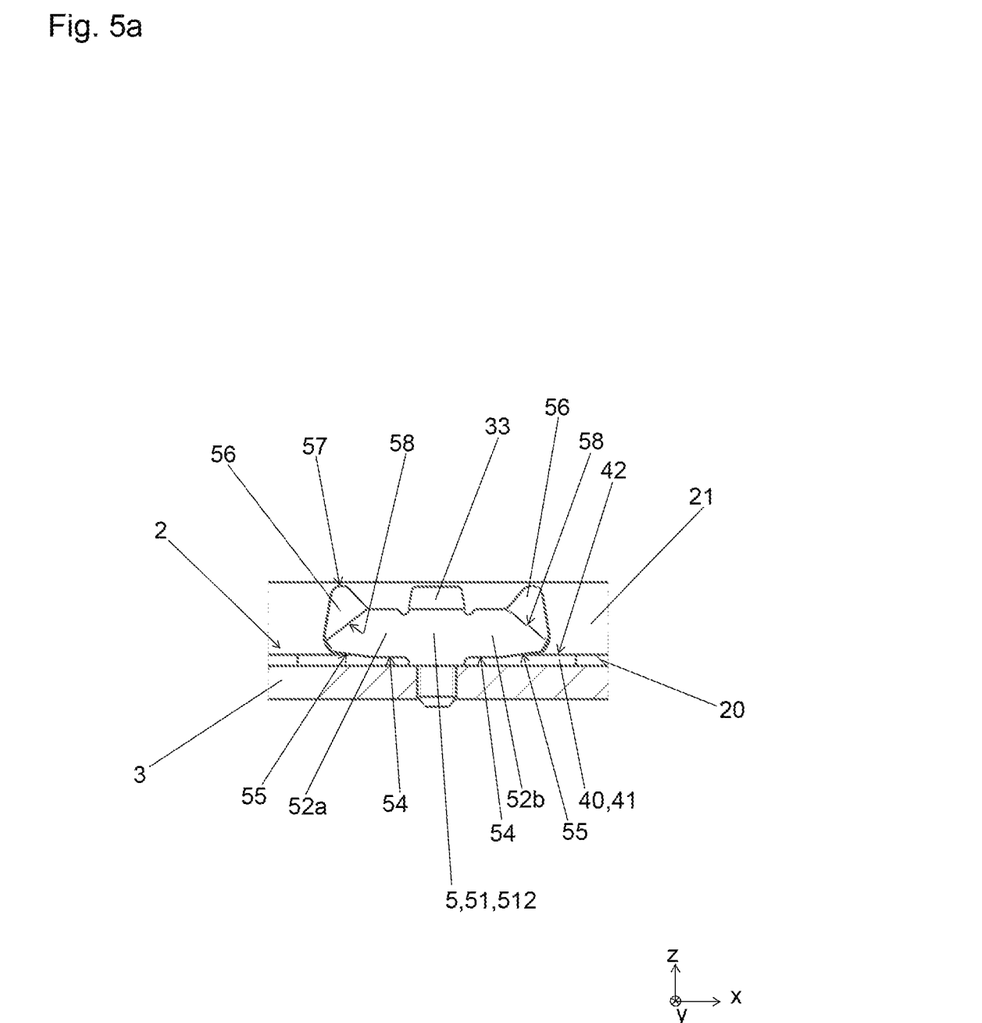
FIGS. 5a and 5b are sectioned front and side views, respectively, of the latching device according to FIG. 2a to FIG. 2d mounted on the mounting base and a snapped-on support rail.
Figure 5B:
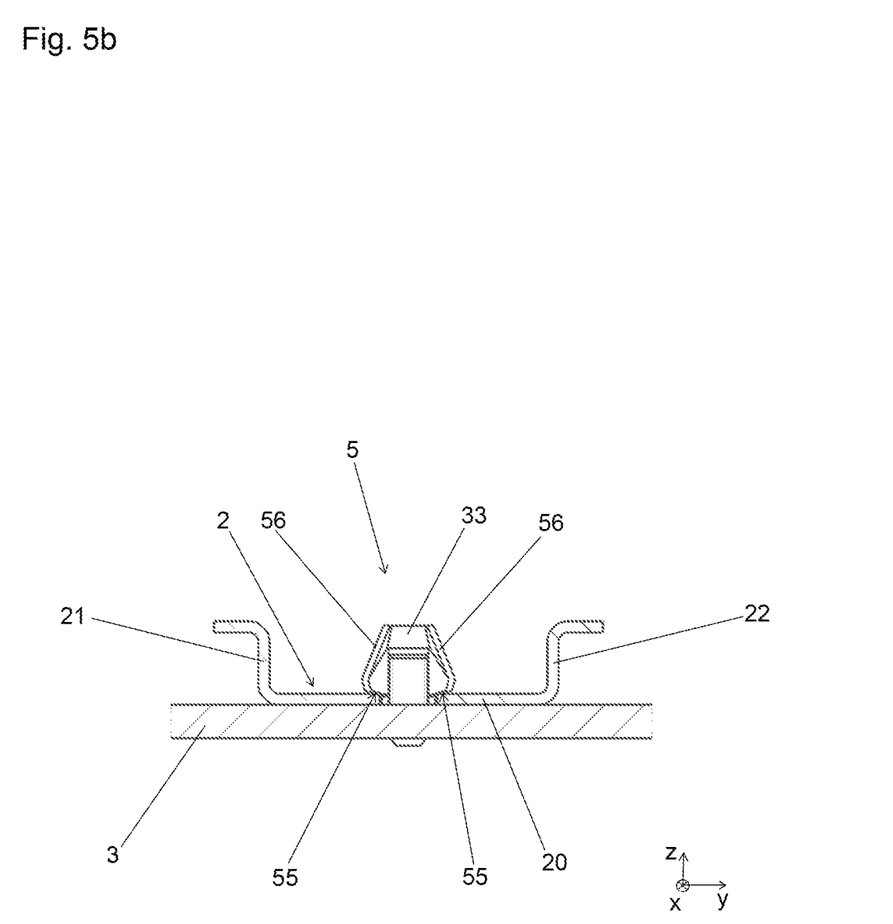
Figure 6A:
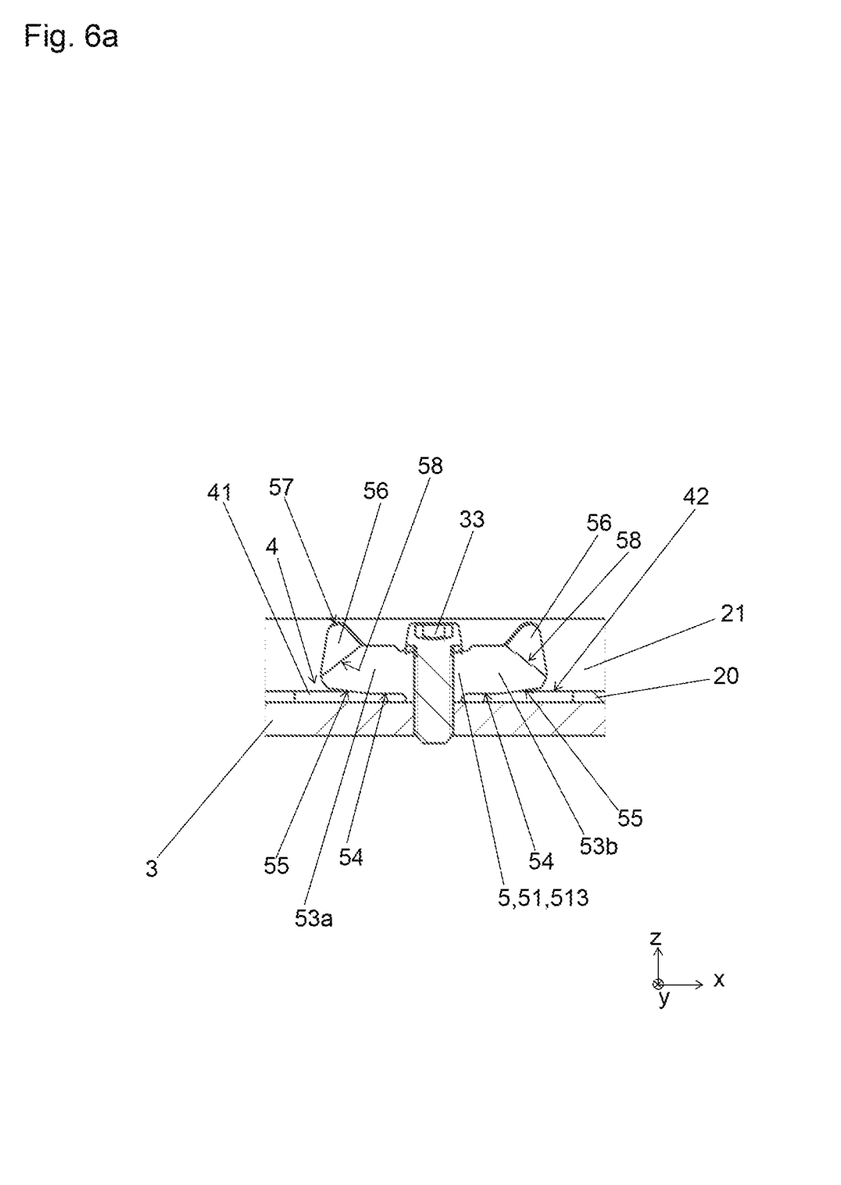
FIGS. 6a and 6b are sectioned front and side views, respectively, of a latching device according to FIG. 2a to FIG. 2d mounted on the mounting base and a snapped-on support rail.
Figure 6B:
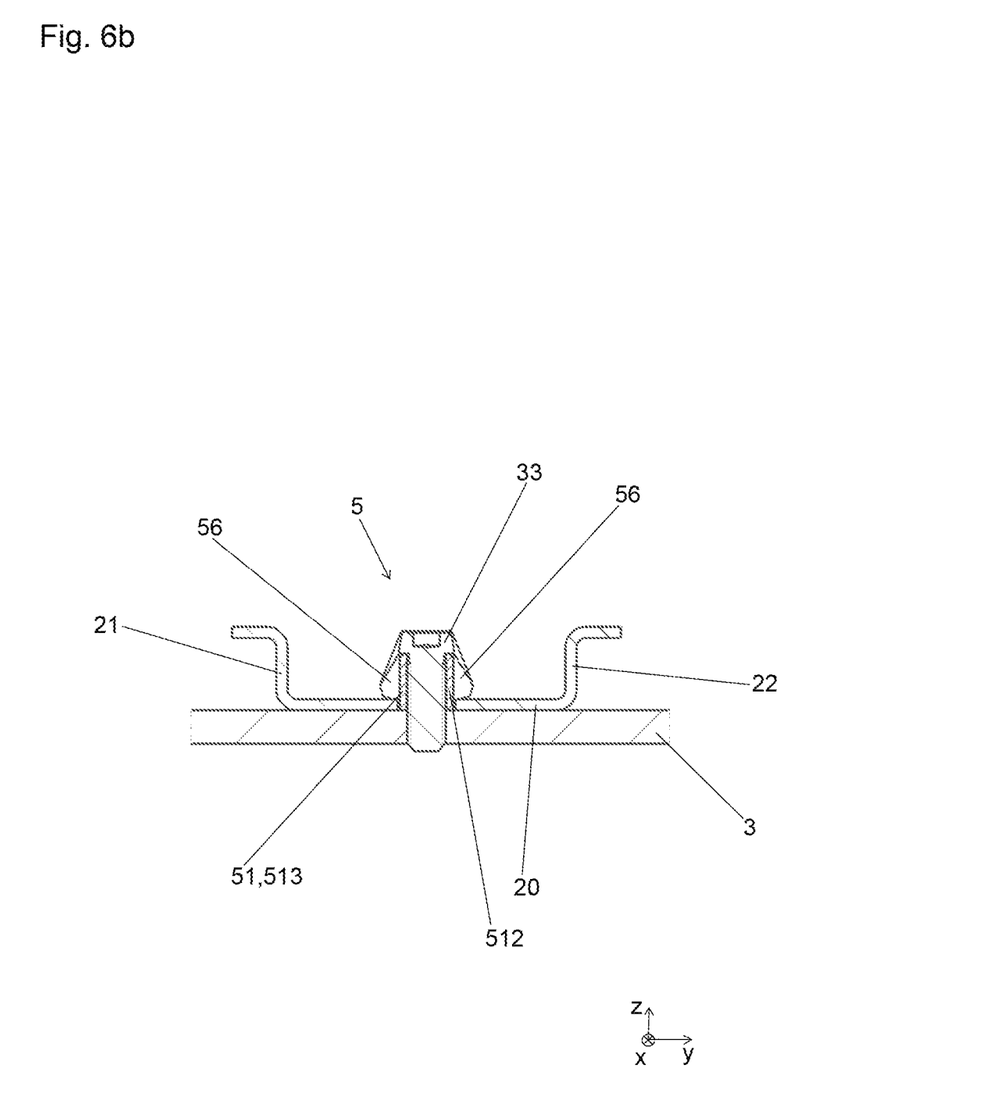

In the mounted state of the support rail 2, the respective angle section 55 rests tightly on the base limb 20 of the support rail 2 and accordingly rests at least in sections on the base limb 20, as shown in FIGS. 5a and 6a.

Figure 2A:
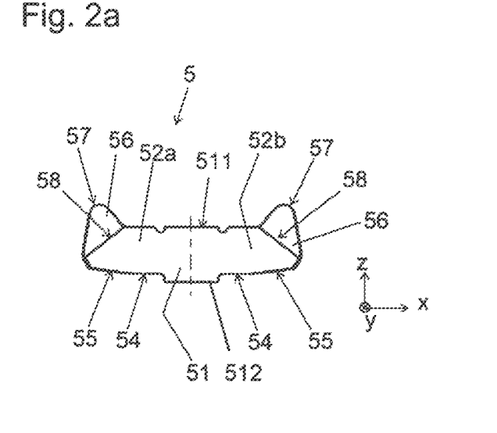
FIGS. 2a, 2b, 2c and 2d are front, side, top plan and perspective views, respectively, of a first embodiment of a latching device.
Figure 2B:
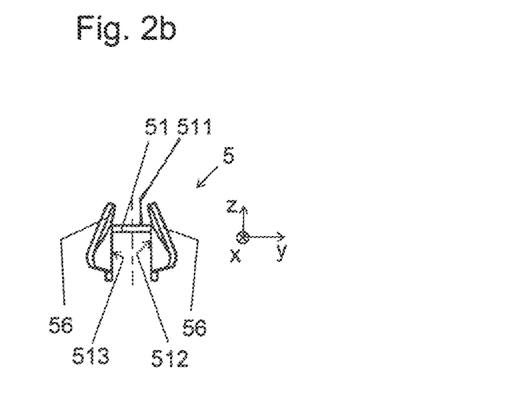
Figure 2C:
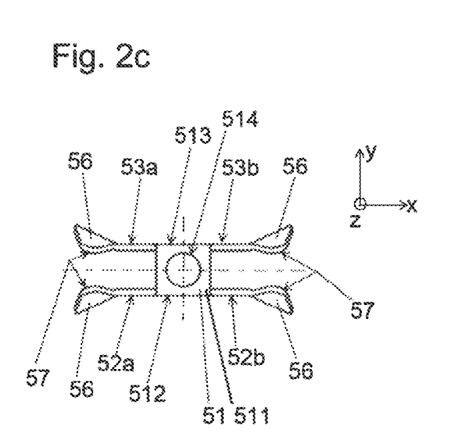
Figure 2D:
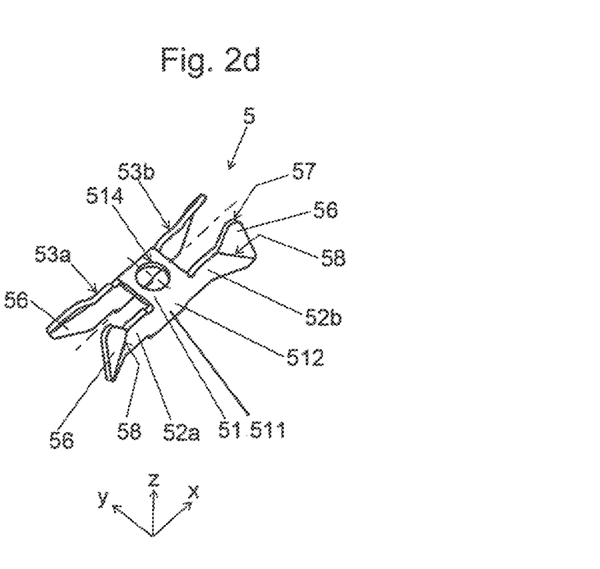

The latching limbs 52a, 52b, 53a, 53b have an insertion chamfer 56 at their free end. The respective insertion chamfer 56 has a rounded region 57. The respective insertion chamfer 56 is realized by a spatially diagonal bend 58 of the respective latching limb 52a, 52b, 53a, 53b. Through the bend 58, both of the respective latching limbs 52a, 52b, 53a, 53b are placed slightly inwards, and the respective insertion chamfer 56 is placed outwards relative to the U-shaped cross-section as shown in FIG. 2c.

Figure 4C:
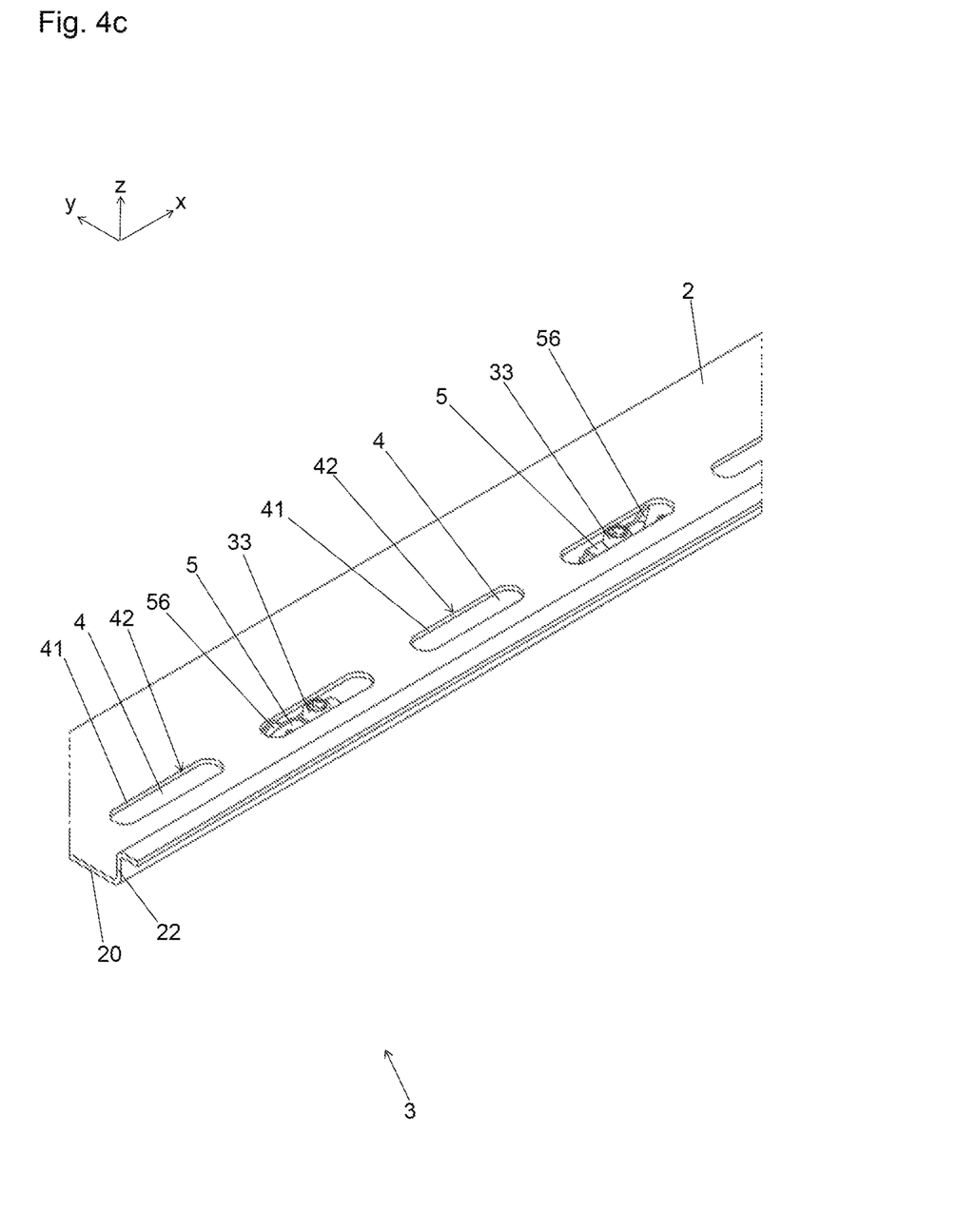

As a result, when the support rail 2 is in the unmounted state, an effective insertion chamfer is provided for the respective elongate hole 4 and, when the support rail 2 is in the mounted state, a resilient effect of the respective latching limb 52a, 52b, 53a, 53b is provided against a wall 41 of the longitudinal sides of the respective elongate hole 4 in the support rail 2. See also FIG. 4c in this regard.

Figure 4D:
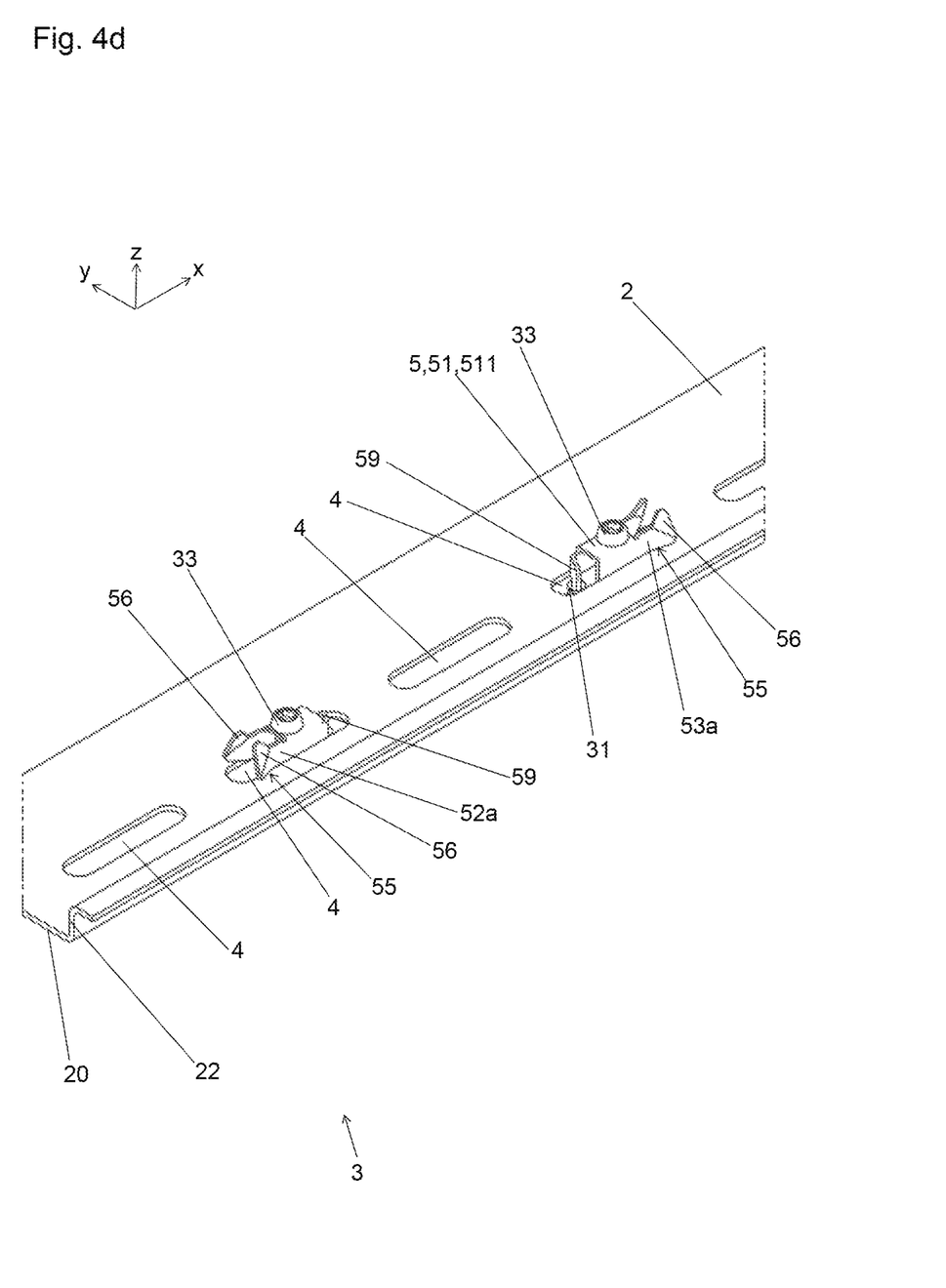

In the latched state, the latching device 5 cooperates with the support rail in the region of the respective elongate hole 4 that acts as mating latching devices at one or more of its edges (longitudinal sides) relative to the latching devices 5, in particular to the latching limbs 52a, 52b, 53a, 53b. The respective latching limbs 52a, 52b, 53a, 53b at least partly engage, through the free cut 54, 55, in the latched state, over an upper border 42 of the longitudinal sides of the respective elongate hole, as is clearly depicted in FIGS. 4d, 5a and 6a and fix the support rail on the mounting base 3 in a latching manner.

The latching device 5 is preferably manufactured from a metal substance, such as steel for example, in one piece as a stamped-and-bent part from a flat material, such as a strip or a sheet, for example. It can be manufactured in a progressive tool.

The latching device 5 enables a tight and preferably flush fitting of the support rail 2 on the mounting base 3. Accordingly, a robust and inexpensive latching device 5 is created which is simple to produce.

A latching device 5 in a second preferred design variant is depicted in FIGS. 1, 3a to 3c, and 4a to 4d. In order to avoid repetitions below, only alterations and additions to the latching device 5 from the first embodiment according to FIGS. 2a to 2d and FIGS. 5a to 6b will be described.

In contrast to the first embodiment of the latching device 5 according to FIGS. 2a to 2d and FIGS. 5a to 6b, the latching device 5 according to the second embodiment is configured substantially symmetrical to a line of symmetry running parallel to the x-axis.

Figure 3A:
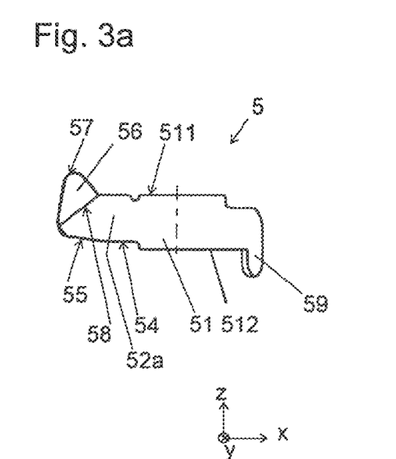
FIGS. 3a, 3b, and 3c are front, side and perspective views, respectively, of a second embodiment of a latching device.
Figure 3B:
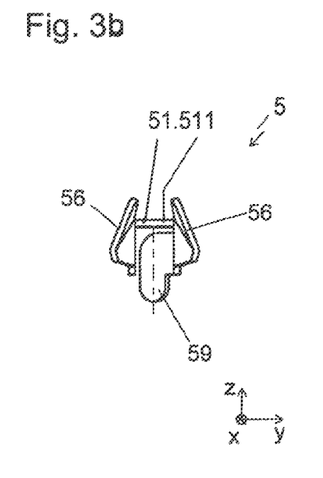
Figure 3C:
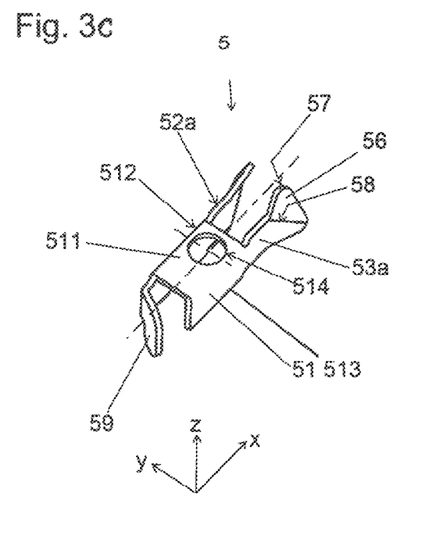

The latching device 5 according to the second embodiment therefore has—alongside the base section 51—only two latching limbs 52a, 53a and accordingly only two insertion chamfers 56. The respective insertion chamfer 56 is likewise generated in each case by the spatially diagonal bend 58.

The side bars 512, 513 are lengthened only on one side of the base section 51—i.e. in each case to latching limbs 52a and 53a in the negative or positive x-direction (see, for example, FIG. 1). Here too, the latching limbs 52a, 53a are cut free so that, in the mounted state of the latching device 5, they do not rest on the mounting base 3 but rather are able to perform a pivoting movement about a substantially vertical pivot axis in the context of their elastic deformability. Here too, a free cut of the respective latching limb 52a, 53a has a parallel section 54 running parallel to the base bar 511, and an angle section 55 at an angle thereto which runs at an angle greater than 10°.

In the mounted state of the support rail 2, the respective angle section 55 rests tightly on the base limb 20 of the support rail 2 and accordingly rests at least in sections on the base limb 20.

In the latched state, the latching device 5 according to the second embodiment also cooperates with the respective elongate hole 4 that acts as a mating latching device, relative to the latching device 5, in particular to the latching limbs 52a, 53a. The respective latching limbs 52a, 53a at least partly engage, through the free cut 54, 55 in the latched state, over an upper border 42 of the longitudinal sides of the respective elongate hole.

The latching device 5 according to the second embodiment furthermore has, on the opposite side of the latching limbs 52a, 53a, a locking section 59. The locking section 59 is provided to lock the latching device 5, in addition to the screwing, on the mounting base 3 in a twist-proof manner. For this purpose, the locking section 59 is configured such that, in the mounted state of the latching device 5, it engages in a bore 31 which is provided for this purpose and which is made in the mounting base 3. See FIG. 1 and FIGS. 4a, and 4c in this regard. The term "bore" should not be interpreted too narrowly. In this respect, the term "bore" should also encompass a circular aperture manufactured not by boring, but rather by piercing or laser cutting, for example.

The bore 31 is positioned relative to the threaded bore 32 in the mounting base 3 such that the latching device 5 according to the second embodiment, after it has been mounted on the mounting base 3, is oriented in alignment with the elongate holes 4 in the support rail 2.

As a result, a twist-proof latching device 5 is created which can be simply mounted due to the locking section 59 and after mounting advantageously no longer additionally has to be oriented parallel to the elongate holes 4 in the support rail 2.

As is clearly shown in FIG. 1 and in FIG. 4b, the latching elements 5 of the second embodiment are preferably placed and attached onto the mounting base 3 in pairs in each case with the locking sections 59 pointing to one another. In this case, the position of the bore 31 into which the locking section 59 engages alternates compared to the position of the threaded bore 32 so that no right and left design of the latching device 5 is required according to the second embodiment. In this manner, two of the latching devices 5 according to the second embodiment interact with regard to the number and orientation of the latching bars 52a, 52b and 53a, 53b like a latching device 5 of the first embodiment.

The arrangement in pairs of two latching devices 5 according to the second embodiment according to FIG. 1 and FIG. 4a to FIG. 4d is advantageous, but not compulsory. The latching device 5 according to the second embodiment can also be arranged with the locking section 59 oriented uniformly in the positive or negative x-direction.

In a further mounting step, the support rail 2 which has been fitted with contact and functional elements 1 in the first mounting step 100 can be locked on the latching device 5 applied onto the mounting base 3 (see FIG. 1 and FIG. 4a to FIG. 4d in this regard). The latching devices 5 preferably do not touch the housings which, where appropriate, have already been snapped onto the support rail.

In this mounting step, the support rail 2 which has been fitted with contact and functional elements 1 in the first mounting step can, for example, be pushed onto the mounting base 3 perpendicularly, i.e. in the negative z-direction, via the respective latching device 5, so that the respective latching device 5 can be mounted, or latched, on the respective elongate hole 4 without a tool. The latching device 5 can be designed particularly advantageously according to the principle of a snap-on hook and interacts with the base limb 20 of the support rail 2 as a latching connection.

It is also possible to first mount the support rail 2 and then fit the housings. Both mounting types can be simply realized with the introduced latching device.

What is claimed is:

1. An electrical housing assembly, comprising
   (a) a mounting base;
   (b) at least two latching devices positioned on said mounting base, each latching device including a base section having a U-shaped cross-section configuration rotated by 180°, said base section being divided into a horizontal base bar and a pair of side bars perpendicular to said base bar, said latching devices further including at least one latching limb, said latching devices being supported on said mounting base as a thrust bearing via said side bars; and
   (c) a support rail on which a plurality of housings equipped with a plurality of at least one of electrical contact and functional elements are arranged, said support rail being latched by said latching limbs of said latching devices for firmly latching said support rail onto said mounting base without the use of any tools.

2. The electrical housing assembly as defined in claim 1, wherein at least one of said side bars is lengthened on at least one side of said base section to said latching limbs which are configured and serve to bear on a side of said support rail which faces away from said mounting base.

3. The electrical housing assembly as defined in claim 2, wherein said latching limbs contain a free cut on a side which faces said mounting base, whereby in the mounted state of the latching devices on said mounting base and prior to mounting of said support rail, said latching limbs do not rest on said mounting base but rather are able to perform a pivoting movement about a vertical pivot axis relative to said mounting base.

4. The electrical housing assembly as defined in claim 3, wherein a respective free cut of said respective latching limb includes a parallel section extending parallel to said base bar and an angle section at an angle thereto which extends at an angle greater than 10°.

5. The electrical housing assembly as defined in claim 4, wherein at least sections of said respective angle section resto on said base limb when in a mounted state of said support rail.

6. The electrical housing assembly as defined in claim 5, wherein respective latching limbs have an insertion chamfer at their free end.

7. The electrical housing assembly as defined in claim 6, wherein said respective insertion chamfer is defined by a spatially diagonal bend of a respective latching limb, wherein said bend of respective latching limbs is placed slightly inwardly and a respective insertion chamfer is placed outwardly relative to said U-shaped cross-section.

8. The electrical housing assembly as defined in claim 1, wherein said support rail contains at least one elongated hole and when said support rail is in a mounted state, a resilient effect of a respective latching limb against a respective wall of one of said longitudinal sides of said elongated hole in said support rail is provided.

9. The electrical housing assembly as defined in claim 8, wherein said latching devices, in the latched state, cooperate with a respective elongated hole, wherein said elongated hole acts as a mating latching device relative to said latching limbs of a respective latching device.

10. The electrical housing assembly as defined in claim 1, wherein said base section contains a bore via which a respective latching device is attached to said mounting base with an attaching device.

11. The electrical housing assembly as defined in claim 1, wherein said latching device enables a flush fitting of said support rail onto said mounting base.

12. The electrical housing assembly as defined in claim 1, wherein said latching devices includes a locking section on an opposite side of said latching limbs, wherein said locking section is configured to engage a bore in said mounting base when said latching devices are in a mounted state.

13. The electrical housing assembly as defined in claim 12, wherein said bore is positioned relative to a threaded bore in said mounting base, whereby each latching device is oriented in alignment with a respective elongate holes in said support rail after mounting on said mounting base.

14. The electrical housing assembly as defined in claim 12, wherein said latching devices are placed on and attached to said mounting base in pairs with said locking sections pointing to one another.

15. The electrical housing assembly as defined in claim 1, wherein said latching devices are preferably manufactured from a metal substance in one piece as a stamped-and-bent part from a flat material.

16. An electrical housing assembly including a mounting base and a support rail on which a plurality of housings equipped with a plurality of at least one of electrical contact and functional elements are arranged, a latching device for mounting the support rail on the mounting base wherein said latching device comprises
  (a) a base section having a U-shaped cross-section configuration rotated by 180°, said base section being divided into a horizontal base bar and two side bars perpendicular to said base bar; and
  (b) at least one latching limb for firmly latching the support rail on the mounting base.

17. A latching device as defined in claim 16, wherein said latching device is manufactured from a metal substance.

18. A latching device as defined in claim 16, wherein said latching device is manufactured in one piece as a stamped-and-bent part from a flat material.

* * * * *